July 10, 1951
E. W. ERICSON
2,560,335
COMBINED CARRYING CASE AND SCREEN FOR PICTURE PROJECTORS
Filed Oct. 4, 1949
2 Sheets-Sheet 2
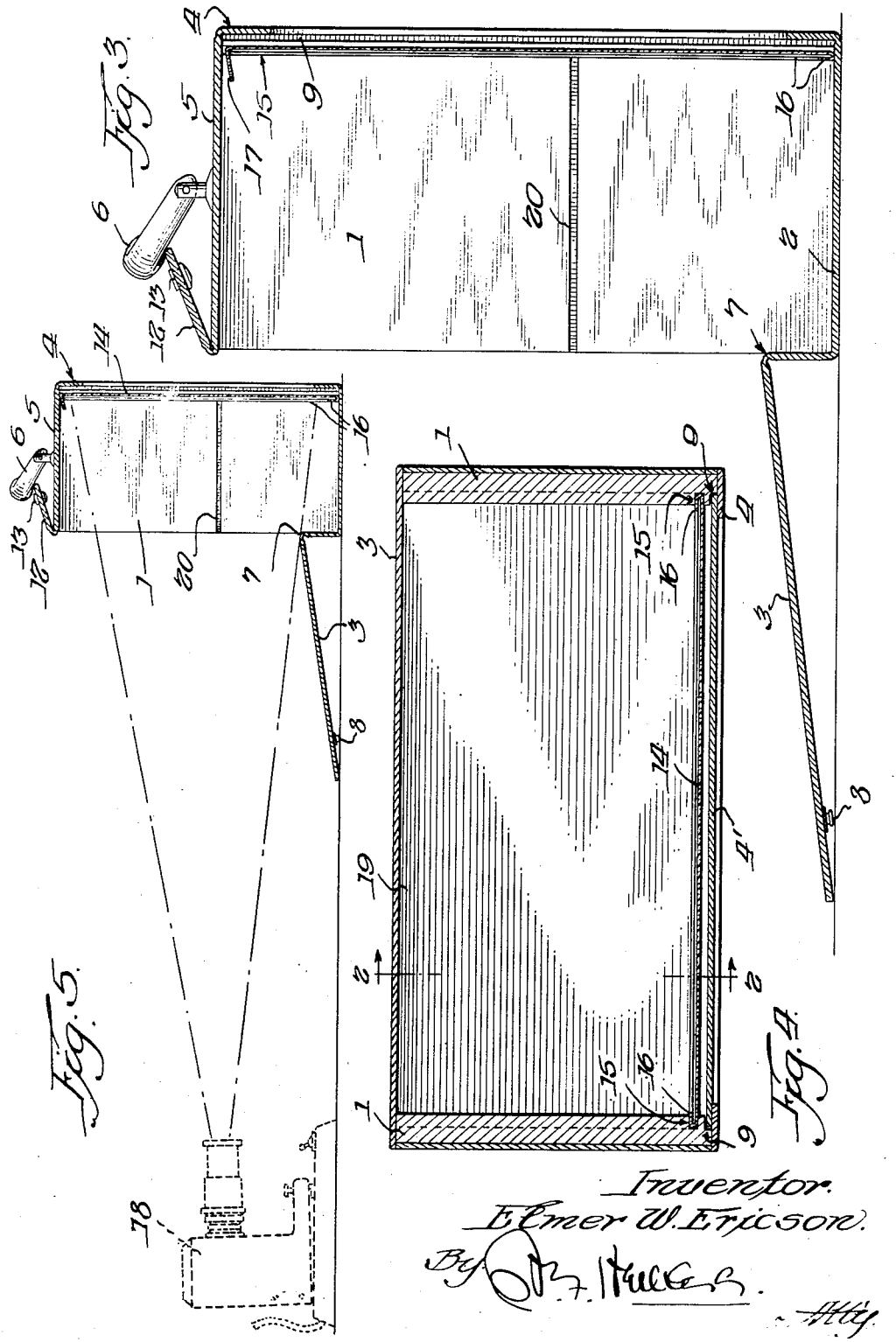
Inventor.
Elmer W. Ericson.

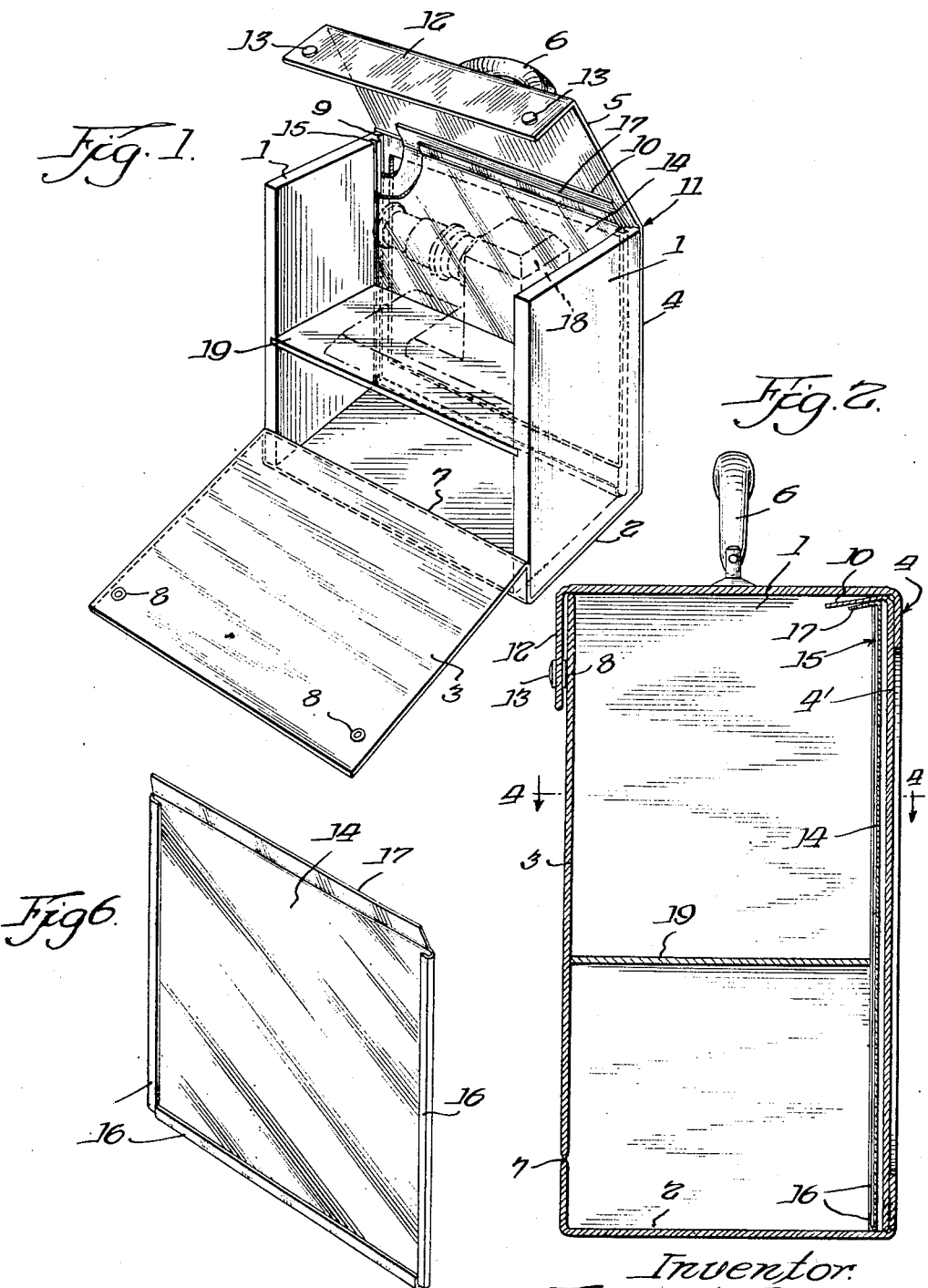

Patented July 10, 1951

2,560,335

UNITED STATES PATENT OFFICE 2,560,335

COMBINED CARRYING CASE AND SCREEN FOR PICTURE PROJECTORS

Elmer W. Ericson, Chicago, Ill.

Application October 4, 1949, Serial No. 119,474

3 Claims. (Cl. 88—24)

This invention relates to improvements in picture projector equipment, particularly to a combined projector carrying and storing case and screen.

An object of the invention is to provide a device of the above indicated character in which a picture projector can be conveniently and safely stored and readily carried; in which various films (motion or slide) can be neatly and orderly stored apart from the stored projector, conveniently accessible for use, as desired, in the projector, and which can be adjusted, upon removal of stored articles therefrom, to provide a screen for receiving and exhibiting pictures projected by said projector.

Another object of the invention is to provide a portable projector receiving and carrying case so constructed that when arranged in open position with the removed projector arranged in picture projecting relation thereto will expose a screen for receiving and exhibiting pictures projected by the projector.

Yet another object of the invention resides in the provision of a combined carrying case and screen wherein the screen, which is of translucent form, is covered and effectively protected by an adjacent wall of the case, capable of being removed therefrom in order that the screen and especially its outer side will be exposed to view so that pictures projected thereonto from its inner side will be satisfactorily exhibited.

More specifically, it is an object of the invention to provide picture projector storing and carrying case in which one of the opaque side walls thereof is removable to expose a juxtaposed translucent picture receiving and exhibiting screen, said screen being shadow-box housed by the case whereby the screen received images will be accorded greater luminosity and sharpness or definition.

The foregoing, as well as other objects, advantages and meritorious teachings of my invention will be in part obvious and in part pointed out in the following detailed disclosure thereof, when taken in conjunction with the accompanying drawings, it being understood that the form of the invention presented herein is precise and what is now considered to be the best mode of embodying its principles, but that modifications and changes can be made in specific embodiments without departing from its essential features.

In the drawings:

Figure 1 is a perspective view of the improved combined projector carrying case and screen in open position, with a slide film type of picture projector shown in dotted lines in stored position therein; parts of the translucent screen and adjacent removable side wall being broken away and shown in section.

Figure 2 is an enlarged vertical transverse section, taken on the line 2—2 of Figure 4, looking in the direction in which the arrows point.

Figure 3 is a like section wherein the case is shown in an open position with the projector supporting shelf removed.

Figure 4 is a horizontal longitudinal section, taken on the line 4—4 of Figure 2, looking in the direction in which the arrows point.

Figure 5 is a reduced vertical transverse section, similar to Figure 3 with one type of slide projector (shown in dotted lines) in operative projecting relation to the case and its screen, and, Figure 6 is a detail in perspective of the translucent screen adapted to be received and mounted in the case in juxtaposed relation to its removable side wall.

Referring in detail to the drawings, the invention comprises relatively opposed and spaced substantially rigid end walls 1; a fixed bottom 2; side walls 3 and 4, and a top or cover 5, all of which can be constructed of wood, metal, composition material and/or combinations thereof, and of rectangular or other desired form or shape. A suitable form of handle 6 may be and preferably is connected to an intermediate portion of the outer side of the cover 5.

The bottom 2 secured to and extended over the lower edges or ends of the end walls 1 is sufficiently sturdy to afford ample supporting efficiencies. If desired the side walls 3 and 4, presently described in detail, can be made of like material and be integral with said bottom, i. e. extended therefrom.

The side wall 3 which is the front wall of the case, is horizontally hinged intermediately of its top and bottom edges, preferably in proximity to said lower edge, as at 7. It can, therefore, be vertically swung downwardly from its closed position (see Figure 2) to an open position (see Figures 3 and 5). The depth of said wall substantially corresponds to that of the end walls 1 and hence, when in vertical or closed position, will lie about flush with their upper edges. Stud members 8 of suitable separable fasteners are mounted on the outer side of the upper and free end of the swingable front wall 7 for a purpose hereinafter described.

The side or rear wall 4 is of composite construction, consisting of a rectangular frame whose top, bottom and sides, of appropriate depths, lie parallel and fixed to adjacent portions of the case end walls 1, and a plane, solid and opaque panel 4'. Said panel is of shape and size substantially corresponding to the rear wall frame, being adapted to be juxtaposed in parallel relation to the inner side of the frame and slidably received and retained in rabbeted adjacent side portions 9 of the end walls 1. Thus, the open intermediate portion of the side wall 4 frame will be fully and effectively closed by the opaque panel 4', though if and when desired, said panel can be removed. To facilitate engagement with the panel for its placement as above, or its removal, a suitable finger tab 10 is provided on its upper side or top.

In order that the normally upper end or side of the case may be effectually closed, as when a projector etc., is received therein, the cover 5 is of a shape and size substantially corresponding thereto. One side of said cover, i. e., that side adjacent the upper side of the rear wall 4, is hinged thereto as indicated at 11, while its opposite side is provided with a hinged flap 12 having appropriately positioned socket members 13 of separable fasteners thereon.

When the cover is in position closing the case upper end or side, as shown in Figure 2, the hinged flap 12 is brought into parallelism to an adjacent portion of the outer side of the hinged front wall 3 and the companionate members of the separable fasteners 8—13 are interengaged, thereby detachably though securely connecting said flap to the front wall.

A translucent picture receiving and exhibiting screen or sheet 14 is slidably engaged in vertically disposed grooves 15, or their equivalents, formed in the inner sides of the case end walls 1 adjacent and parallel to the rabbeted portions 9 thereof. This screen is of shape and size substantially corresponding to the case rear wall assembly, hereinbefore described, and as will be seen upon reference to Figures 2, 3 and 4 of the drawings, is arranged in proximity to its normally inner side. The screen is preferably bodily reinforced against unwanted flexing and edge wear by infolding marginal portions of the same, as at 16, and has a finger engaging tab 17 on its normally upper side to facilitate engagement therewith for obvious purposes.

With a view toward providing the case with means for receiving and supporting a projector, such as shown in dotted lines in Figures 1 and 5 and designated by the reference numeral 18, in the improved carrying case, I may employ a shelf 19 of shape and size substantially corresponding to the horizontal cross-sectional internal area thereof. The opposite end portions of the shelf are slidably received in relatively opposed horizontal grooves 20 formed in and intermediately of the inner sides of the end walls 1. Being so engaged and horizontally supported, the shelf will divide the case into upper and lower compartments, the upper receiving the projector 18 and the lower affording convenient and most desirable space for receiving picture slides, film, etc.

When it is desired to use the carrying case for exhibiting from its outer screen side pictures projected by the projector 18, the case cover 5 is opened in the manner shown in Figure 1 following disconnection of the separable fasteners 8—13. Thereupon, the hinged front side wall 3 is swung downwardly and outwardly exposing the case interior and the flap 12 upwardly under the handle 6 (see Figures 3 and 5). The projector 18 and the shelf 19 are now removed from the case and the projector and case are relatively positioned as shown in Figure 5. Picture slides, film, etc., are, of course, removed from the case lower compartment and at this time the inner side of the translucent screen 14 is completely exposed to the projector lens. The opaque panel or false rear wall 4' is upwardly removed from the case to expose the outer side of the screen. At this time, pictures may be projected from the projector onto the inner side of the translucent screen and viewed by an audience from its outer side.

Due to the fact that pictures from the projector 18 are received on the inner side of the translucent screen 14 via the open front side of the carrying case, it will be understood and appreciated that said screen is provided with a most satisfactory and desirable form of shadow box, to wit, the end walls 1, the bottom 2 and the top or cover 5. Consequently, images or the like received on the screen will be beneficially defined for greater sharpness of vision.

Used as a carrying case, the shelf 19 is replaced in the case, as aforedescribed; the projector supported thereon; picture slides or film placed in the case lower compartment, whereupon the panel or false wall 4' is replaced adjacent the frame of the rear side wall, and the front wall 3 and cover 5 closed and interconnected in the fashion shown in Figure 2.

While I have heretofore described my invention as being employed to house a portable slide projector, it is obvious that other and different types of picture projectors can be placed and carried therein; also, that the particular form of translucent screen positioned inwardly of and adjacent the frame and opaque panel of the case rear side wall can be varied and yet remain well within the province of said invention. By the same token, the mounting arrangement of said screen in the case can be varied, but it is now believed preferable that the same should be positioned in immediate proximity to and extended over the composite rear side wall 4 in substantially parallel relation thereto.

I claim:

1. A carrying and exhibiting device for picture projectors, comprising a receptacle including end, front and rear side walls, a bottom and a top, one side wall being hingedly mounted in proximity to the lower portion thereof to adjacent portions of said end walls swingable outwardly and downwardly to expose the receptacle interior, the remaining side wall being of composite construction and opaque and consisting of a substantially rectangular frame and a false wall removably positioned adjacent and extending substantially entirely over the inner side of said frame, and a translucent sheet-like body vertically positioned in the receptacle in proximity to and disposed substantially over the inner side of said remaining composite side wall.

2. A carrying and exhibiting device for picture projectors, comprising a receptable including end walls, a side wall, a bottom, a top and an open framed remaining side, opposite to and spaced from said side wall, an opaque panel removably received and supported in the receptacle in juxtaposed relation to and over the open framed remaining side, and a translucent sheet-like body received and supported in said receptacle inwardly of and juxtaposed with relation to the open framed side and opaque panel, shadowed by the end walls, bottom and top.

3. In a carrying and exhibiting case having end and side walls, a top and a bottom, one side wall and the top being movable to open and provide access to and expose the case interior, the remaining side wall having an intermediate window opening therein, a translucent screen slidably received in and between the end walls adjacent and substantially parallel to said remaining side wall overlying the window opening therein, said screen being slidably removable from the end walls upon movement of the top to an open position with relation to the case, and an opaque panel slidably received in and between said end walls, outwardly of said screen, substantially parallel to the remaining side wall and overlying the window opening therein, said panel being slidably removable from the end walls upon movement of the top to an open position with relation to the case.

ELMER W. ERICSON.

REFERENCES CITED

The following references are of record in the file of this patent:

UNITED STATES PATENTS

| Number | Name | Date |
|---|---|---|
| 1,351,765 | Koch | Sept. 7, 1920 |
| 2,070,226 | Erwood | Feb. 9, 1937 |
| 2,139,152 | Freimann | Dec. 6, 1938 |
| 2,221,160 | Worthington et al. | Nov. 12, 1940 |
| 2,345,202 | Larson | Mar. 28, 1944 |
| 2,450,757 | Hutchison | Oct. 5, 1948 |